United States Patent [19]

Pelkmann et al.

[11] 4,311,949
[45] Jan. 19, 1982

[54] SEMICONDUCTOR CIRCUIT FOR SPEED CONTROL OF ELECTRIC MOTORS

[75] Inventors: Bernhard Pelkmann, Haar; Dieter Vogel, Eglharting, both of Fed. Rep. of Germany; Alfred Schenkl, Johnson City, Tenn.

[73] Assignee: Siemens Aktiengesellschaft, Berlin & Munich, Fed. Rep. of Germany

[21] Appl. No.: 54,584

[22] Filed: Jul. 3, 1979

[30] Foreign Application Priority Data

Jul. 10, 1978 [DE] Fed. Rep. of Germany ....... 2830212

[51] Int. Cl.³ .................................................. H02P 5/16
[52] U.S. Cl. .................................. 318/799; 318/314; 318/318; 318/341
[58] Field of Search ............ 318/326, 327, 328, 345 H, 318/345 D, 799, 800, 809, 245, 341, 314, 318

[56] References Cited

U.S. PATENT DOCUMENTS

| | | | |
|---|---|---|---|
| 3,740,633 | 6/1973 | Buttafava | 318/328 |
| 4,025,837 | 5/1977 | Meier et al. | 318/561 |
| 4,054,820 | 10/1977 | Foster | 318/341 |
| 4,063,146 | 12/1977 | Oliver | 318/332 |
| 4,066,941 | 1/1978 | Foster et al. | 318/341 |
| 4,104,570 | 8/1978 | Hamby et al. | 318/318 |
| 4,130,785 | 12/1978 | Penet | 318/318 |

OTHER PUBLICATIONS

A. Dosch et al., "Elektronik", Elektronische Drehzahlregelung bie Elektrowerkzugen (Electronic Speed Control in Electric Tools) 23, No. 1/1974 pp. 9-12.
B. R. Best, "Theorie und Anwendungen des Phase-Locked Loops" Published in Der Elektroniker (1975/1976) No. 7 pp. EL26-EL32.
Bose et al., "Digital Speed Control of a D.C. Motor with Phase-Locked Loop Regulation", *Proc. Industrial Electronics and Control Instrumentation*, 3-77.
Lin et al. "A Microprocessor Speed Control System" *Proceedings*, Industrial Elec. & Control Instrumentation Mar. 1977 pp. 144-151.

*Primary Examiner*—David Smith, Jr.
*Attorney, Agent, or Firm*—Hill, Van Santen, Steadman, Chiara & Simpson

[57] ABSTRACT

A digital control loop is provided in which analog signals supplied by a tachometer, driven by an electric motor, are digitally evaluated, that is are compared with a reference value existing in digital form, and a deviation from the reference is employed for controlling the adjustment of an element, a thyristor preferably a triac, by way of an adjusting value generator which is likewise designed as a digital circuit. The speed control regulator can be designed both with an integral control behavior, and a differential control behavior, as well as being designed with a proportional control behavior and combinations thereof.

10 Claims, 4 Drawing Figures

SEMICONDUCTOR CIRCUIT FOR SPEED CONTROL OF ELECTRIC MOTORS

BACKGROUND OF THE INVENTION

1. Field of the Invention

The present invention relates to a semiconductor circuit for a speed control of an electric motor, and more particularly to a monolithically integrated semiconductor circuit for speed control of an electric motor in which an electric voltage, depending on the actual value of the speed, is generated by means of a sensor and is employed for controlling an adjusting element which influences the speed in the sense of a feedback coupling by way of the current feeding of the electric motor.

2. Description of the Prior Art

A semiconductor circuit of the type generally set forth above is described in general in the publication "Elektronik", 23, No. 1/1974, pages 9-12, and is illustrated in the circuit diagram in this publication. In the circuit disclosed therein, a tachometer is coupled to the axis of the motor and emits a voltage which is proportional to the speed. Furthermore, a thyristor, particularly a triac is provided as an adjustment element which regulates the sinusoidal a.c. current, particularly the conventional supply a.c. current, driving the motor in the sense of a phase control, i.e. allows more or less or the half wave concerned to reach the motor. The actual regulating circuit is constructed as an analog circuit and employs capacitors and resistors in addition to transistors and diodes.

SUMMARY OF THE INVENTION

An attempt to integrate a circuit of the type described above, completely in monolithic semiconductor technology, should meet with serious difficulties in view of the required high resistances and capacitances. On the other hand, a monolithic format of such a regulating circuit would produce the possibility of saving significant manufacturing costs. It is therefore the object of the present invention to provide a regulating circuit of this type.

To this end, and in accordance with the present invention, the control of an electric motor occurs by way of an analog/digital converter which is connected between the speed sensor and an adjusting element for controlling the current of the motor.

Also to this end, there are a number of possible circuit arrangements. The optimum development is therefore described in greater detail below. The optimum development is tailored to the regulation of a.c. motors, although the principle of the invention can also be successfully employed for the regulation of d.c. motors.

In many applications of a.c. universal motors, the use of properties of the devices are significantly improved when the speed of the motors can be held constant, independent of the load and can be adjusted in a wide range. As examples for such uses, manual drills, grinding machines, kitchen machines and lawn mowers are of particular concern.

The known solutions partially employ the counter-electromotive force of the motors, generated by means of the counter inductivity, as a measure for the actual value of the speed, which is then prepared by means of resistor-capacitor (RC) combinations, and is then compared, on an analog basis, with a reference value, and is then converted into an adjusting magnitude which is generally provided by means of the change to be undertaken of the adjustment of the operating angle. In another process, which, for example is employed in the regulator described in the above reference, the voltage dependency of the speed of the tachometer generators is employed as a measure for the actual value of speed, which then, likewise in a suitable analog circuit, is processed into the required adjustment magnitude.

In a device constructed tin accordance with the present invention, however, a significant portion of the control loop is designed as a digital circuit, whereby the high resistances and capacitances required for the corresponding analog circuits are obviated, so that, given a corresponding design of the circuit of the control loop, the same can be incorporated in a single integrated circuit (IC) module.

In a simple embodiment of a device constructed in accordance with the present invention, digital pulses derived by an analog/digital converter from the signal supplied by the sensor, and forming the actual value of the speed of the motor to be regulated, are employed for the control of the current supply to the electric motor, according to the measure of the deviation from the reference value supplied, in digital form, by a reference value generator, in the sense of a reduction of the deviation, which, for example, can occur by way of a computer. To this end, the actual value signals supplied by the sensor, via the analog/digital converter, are compared with the reference values which are likewise prescribed by the reference value generator in digital form in a computer which serves as a comparator. The deviation thereby obtained is converted, by means of a computer, into the adjusting value appropriate for the deviation, and, finally, the adjusting element is controlled according to the adjusting value respectively supplied by the adjusting value generator, if necessary, upon interposition of a digital/analog converter.

Another possibility is that the adjusting values are supplied, in digital form, by a computer, directly to the adjusting element, which then releases or blocks the current which serves for the operation of the electric motor, according to the measure of the respective adjusting value.

In a preferred embodiment of the invention, a circuit is provided for a sensitive, digital regulation of a.c. universal motors, according to the phase control principle, which allows a great regulation range, which is completely realizable in a monolithically integrated semiconductor circuit, which allows the control characteristics of integral control units, proportional control units, differential control units, and combinations thereof, to be employed.

BRIEF DESCRIPTION OF THE DRAWINGS

The invention, its organization, construction and operation, will be best understood from the following detailed description thereof, taken in conjunction with the accompanying drawings, on which.

DESCRIPTION OF THE PREFERRED EMDOBIMENTS

Figure 1:
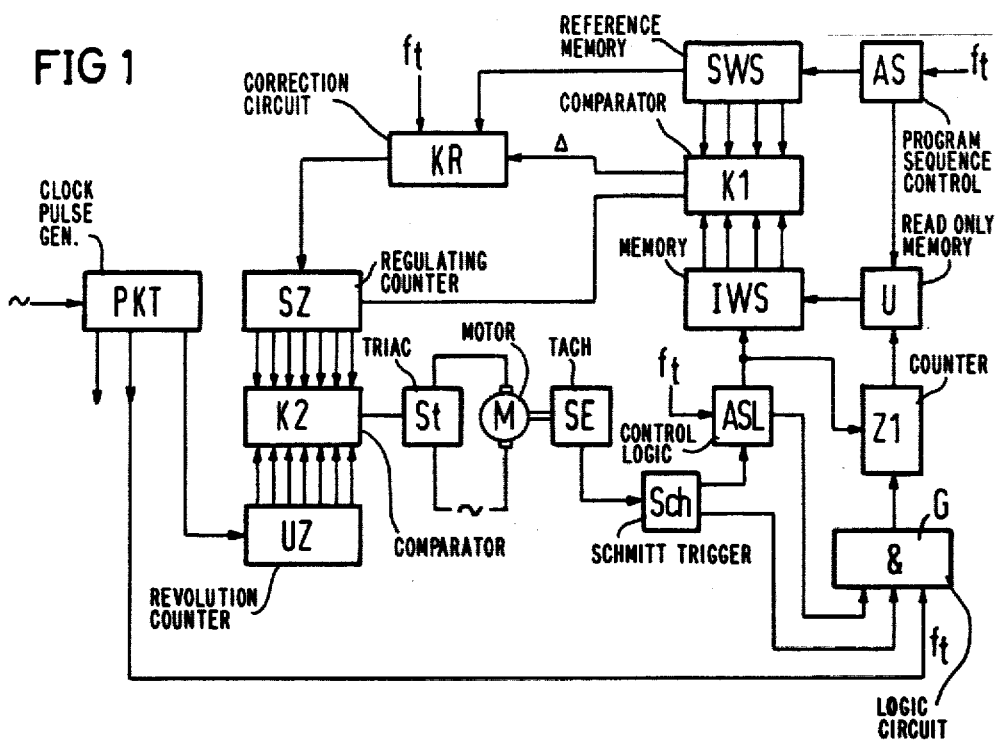
FIG. 1 is a schematic circuit representation of a speed control system constructed in accordance with the present invention.

Referring to FIG. 1, an electric motor M has a rotating shaft which is coupled to a sensor SE which provides an electrical a.c. voltage which corresponds to the actual speed of the motor M. A tachometer generator, for example, may be provided as the sensor, SE. The tachometer can be designed as an optoelectronic device which is provided, for example, by means of a diaphragm rotating with the shaft of the motor M, which, with each revolution, blocks and then releases an optical connection between a constant light source and a photoelectric element, for example, a stationary photodiode. The electric pulses supplied by the photoelement, particularly after amplification, are supplied to an analog/digital converter.

The tachometer can also be an electromagnetic sensor which functions on the induction principle. For example, to this end, a magnet may be secured to the rotating shaft of the motor, which magnet generates an alternating magnetic field at the location of a stationary inductive loop with the rotational frequency of the motor, by means of which a corresponding a.c. voltage is induced in the induction coil representing the actual sensor, which voltage, particularly after amplification, is then fed to the input of an analog/digital converter. A magnetoresistor, a Hall probe, or some other type of sensor which reacts to the magnetic alternating field, can be employed in the embodiment just described in the place of an induction coil.

The sensor SE, designed as a tachometer generator supplies an a.c. voltage corresponding to the rotational frequency of the motor M in which the number of maximums or, respectively, minimums or, respectively, zero passages occurring per second corresponds to the rotational frequency or to a whole multiple of the rotational frequency. This fact establishes, for example, the possibility of counting time between the occurring maximums or zero passages, binarily in corresponding devices, so that an analog/digital converter is realizable in this manner. This is particularly true of the device illustrated in FIG. 1.

In FIG. 1, pulses delivered by the tachometer generator SE are transmitted by way of a Schmitt trigger, Sch combined with an overvoltage protection both to a logical linkage G as well as to an evaluation control logic ASL. The evaluation control logic ASL is connected to a second input of the logical linkage G, which has a third input charged with a clock pulse $f_t$ supplied from a clock pulse generator PKT. In the exemplary embodiment illustrated in FIG. 1, the logical linkage G is provided by means of an AND gate.

The evaluation control logic ASL has two logical inputs and two signal outputs which are differently charged in the logic conditions by means of particular input signals. The one input is connected to the output of the Schmitt trigger Sch which serves for pulse shaping; the other output is controlled by means of the clock pulses $f_t$ which are supplied by the clock pulse generator PKT and having a significantly greater frequency, in comparison to the signals supplied from the Schmitt trigger Sch. The two outputs of the evaluation control logic ASL are differently charged by means of corresponding linkage and combination of the logical elements making up the evaluation control logic in such a manner that the first output of the evaluation control logic ASL, connected at the third input of the logic linkage G, produces, together with the two inputs of the control logic ASL, a logical function corresponding to a gate which is controlled by means of the sensor signal.

The second logical output of the evaluation control logic ASL is connected both to a counter Z1 charged by means of the logical linkage G as well as at the actual value memory IWS and has a logical function as a function of the charging of the two inputs of the evaluation control logic ASL in which the counter Z1 and the actual value memory IWS are reset, or the content of the counter Z1 is loaded into the actual value memory IWS, via a converting-read-onyl memory U. To this end, the evaluation control logic ASL can be realized, for example, by means of a network consisting of exclusive OR (EXOR) gates or of edge-controlled flip-flop cells.

The signal output of the logic linkage G, as just indicated, is applied to a counting input of the binary digital counter Z1 whose reset input is charged by means of the second output of the evaluation control logic ASL. The signal outputs of the digital counter Z1 are applied to the corresponding signal inputs of a converting-read-only memory U, i.e. to a correspondingly programmed read-only memory (ROM). The ditithave information programmed into the ROM serves for the modification of the information supplied from the signal outputs of the counter Z1, which are than temporarily stored in a modified state in the actual value memory IWS. To this end, the actual value memory IWS is designed as a read/write memory (RAM) and is preferably realized by means of a linear counter chain.

In addition to the actual value memory IWS, a reference value memory SWS is provided which exhibits the same number of storage locations as in the actual value memory IWS. This is, preferably, likewise designed as a write/read memory. However, a read-only memory can also be employed.

As accordingly fetched, by means of the fixed-program sequence control AS, which controls both the actual value memory IWS by way of re-shaping ROM device U, as well as the reference value memory SWS, which is in turn controlled by means of the clock pulses $f_t$ supplied from the clock pulse generator PKT, the information stored in the actual value memory and in the reference value memory are supplied to a comparator K1 in which momentary deviation $\Delta$ including its operational sign, is determined and relayed to an adjusting element which functions in the manner of a feedback circuit, i.e. in the manner of a reduction of the respective error, upon mediation of a correction circuit KR and an adjusting value generator which is controlled by means of the correction circuit KR and, in part, also by the comparator K1.

As already set forth above, the actual adjustment element is preferably a thyristor, for example, a triac. For controlling the triac, however, the circuit portions mentioned above and provided between the comparator K1 and the adjusting element St are realized particularly, upon the employment of counters whereby a certain similarity to the arrangement of the actual value memory and the reference value memory is provided.

Figure 2:
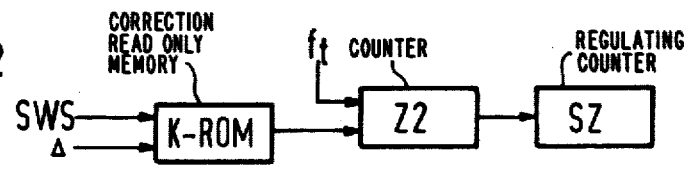
FIG. 2 is a schematic block diagram representation of another embodiment of the invention.
Figure 3:
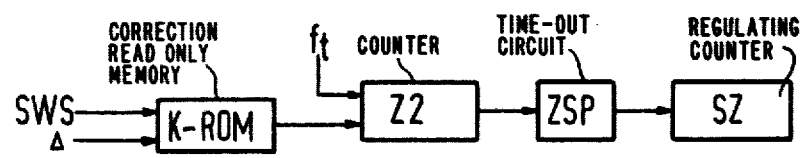
FIG. 3 is a schematic block diagram representation of another embodiment of the invention.
Figure 4:
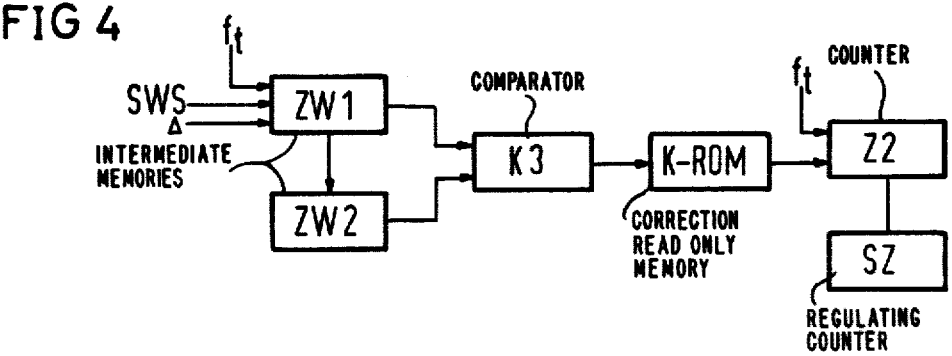
FIG. 4 is a schematic block diagram of yet another embodiment of the invention.

A correction circuit KR, whose specific embodiments are illustrated in FIGS. 2–4, is charged, on the one hand, by means of a signal from the comparator K1 containing the respective error $\Delta$, as well as by means of the respectively attached or dependent reference value from the reference value memory SWS. The charging with the respectively associated reference values has the purpose of adapting the follow-up magnitude for the adjusting element, i.e. the adjusting value for the acceleration of the regulating process, to the characteristics of the motor M, which are different for different speeds.

The clock pulse $f_t$ appertaining from the individual circuit portions is advantagously provided by pulses which are derived from a.c. voltage source, also operating the motor M. To this end, the a.c. voltage source is connected to a pulse generator PKT which, for example, is designed as a phase locked loop system, i.e. a PLL system. Details concerning such a system may be derived, for example, from the article by R. Best "*Theorie und Anwendungen des Phase-Locked-Loops*" which was published in a periodical "Der Elektroniker" (1975/1976), Nos. 6–8. The pulses supplied by the clock pulse generator PKT are provided at the sequence control AS, at the evaluation control logic ASL, at the third input of the logical linkage G, at the correction circuit KR and at the circuit portions preparing the signal supplied from the correction circuit KR as an adjusting value for the adjusting element. The pulse generator PKT is advantagously provided with at least one subsequently-connected divider chain.

For generating the adjusting values controlling the adjusting element St, designed as a thyristor, there is provided a system which contains a comparator K2, a revolution counter UZ and a regulating counter SZ, charged by means of the signals emitted by the correction circuit KR, the signal output of the regulating counter SZ being provided by means of the output of the comparator K2 connected to the ignition electrode of the adjusting element St. Thereby, the clock pulse $f_t$ which controls the revolution counter UZ is directly supplied by the clock pulse generator PKT, whereas the clock pulse supply to the regulating counter SZ is provided by way of the correction circuit KR. The regulating counter SZ is designed as a forward-backward counter, whereas the remaining counters UZ, Z1, the counter Z2 in the correction element KR and the memories IWS and SWS, in case these are designed as storage chains, i.e. as counters, for the sake of simplicity, can be realized by means of simple digital counters.

With the exception of details of the correction circuit, the system illustrated in FIG. 1 is described below.

A signal generated by the tachometer generator SE is edited by the Schmitt-trigger Sch into rectangular pulses and is applied to the logical linkage G, together with the counter clock pulse $f_t$ supplied by the clock pulse generator PKT. The number of clock pulses appearing at the output of the logical linkage G is directly proportional to the period duration of the pulses emitted by the tachometer generator SE which is, in turn, inversely proportional to the frequency of the pulses and, therefore, inversely proportional to the speed of the motor M.

The pulses emitted by the logical linkage G, which has three inputs, and which is provided as an AND gate, are counted in a counter chain Z1 which serves as an intermediate memory. The number of clock pulses is read out in parallel from the counter chain Z1, as a binary word, and is applied to an address line of a conversion memory U. The conversion of the period duration to frequency is stored in tabular form in the ROM memory U. Therefore, a binary word which corresponds to the frequency or, respectively, speed, measured by the tachometer SE is provided at the output of this memory. This word is read into the actual value memory IWS. An arithmetic unit, with whose assistance the conversion of period duration to frequency occurs, may also be provided in the place of an ROM memory U.

At the beginning of each half wave of the a.c. voltage which drives the motor M, the evaluation control logic ASL resets the memory counter units previously addressed to their initial states and provides that the logical linkage G can be opened only after the next edge of the signal supplied by the Schmitt-trigger Sch following the zero passage of the a.c. voltage. In addition, it blocks the logical linkage G after the conclusion of a period duration of the signal arriving from the Schmitt trigger Sch until the next zero passage of the applied a.c. voltage. By doing so, it is guaranteed that the value of the motor speed in the actual value memory IWS is retained after the zero passage of the a.c. voltage until the next zero passage, so as to provide a phasing-in-process.

The value of the speed in the actual value memory IWS is compared in the comparator K1 with a reference value stored in a reference value memory SWS. This comparison can occur in that both values are subtracted in an arithmetic unit (adder, comparator), whereby the differential amouint $\Delta$, i.e. the momentary deviation including its operational sign, is made available at the output. The determination of the deviation in the comparator K1 can alternately occur in that a counter is set by means of one of the two memories IWS or SWS, i.e., either by means of the actual value or by means of the reference value, and then its counter reading is counted back with the content of the other memory. After the conclusion of this operation, the difference $\Delta$ of the storage contents of the memories remains in the counter.

The reference value can either by directly input into the reference value memory SWS in parallel, by way of a coder switch, or can be fed in by way of another switch whose signal is edited via a suitable operating logic circuit in such a manner that it corresponds to the signal obtained from a coder switch.

On the other hand, the reference value memory SWS can be counted up with clock pulses $f_t$ by way of an operating switch, whereby the content of the reference value memory SWS, and therefore, the reference value of the speed, can be sensitively changed over the operating time of the switch.

The difference between the reference value and the actual value gained from the comparator K1 is a direct measure for the momentary deviation $\Delta$. The follow-up magnitude for the adjusting element St is obtained from the momentary deviation in a correction circuit KR. Moreover, the information relating to the operational sign of the deviation $\Delta$ is supplied by the comparator K1 to a regulating counter SZ and, therefore, its counting direction is established. A control circuit is provided between the correction circuit KR and the adjusting element St and is constituted, for example, by the elements SZ, UZ and K2 which supply the adjusting value required for the control of the adjusting element St which is, for example, a triac, to a phase angle adjustable according to the measure of the momentary deviation $\Delta$ with respect to the a.c. voltage supplied to the motor M and to the PLL circuit PKT.

A revolution counter UZ provided in the control circuit is reset upon the zero passage of the a.c. voltage applied to the motor and is counted up during a half wave with corresponding clock pulses $f_t$, synchronous with a.c. voltage in such a manner that the counter reading of the counter UZ receives its maximum value at the end of each a.c. voltage half wave.

A regulating counter SZ provided in the control circuit is charged by means of the correction circuit KR and its storage content is compared in a further comparator K2 with the content of the revolution counter UZ. If the contents of the two counters SZ and UZ coincide, then the comparator K2 emits a signal which, after a corresponding amplification by an amplifier (not illustrated), is supplied as an ignition pulse to the control electrode of the adjusting element St. The content of the regulating counter SZ therefore determines the time of ignition and, therefore, the respective operating angle for switching on the corresponding half wave of the a.c. voltage which drives the motor M.

The follow-up magnitude to be obtained from the correction circuit KR, therefore, must consist of clock pulse with which the regulating counter SZ can be counted up and counted down. The number of these clock pulses, in conjunction with the length of the regulating counter (number of storage cells forming the counter, bit rate), determines the respective extent of the adjustment of the regulating counter SZ.

The arrangement described requires clock pulses $f_t$ for its operation with, under certain conditions, different frequencies which are synchronized with a.c. voltage applied to the motor which is achieved by means of the PLL circuit PKT.

As can be seen, the regulating behavior of the system illustrated in FIG. 1 is determined by means of the correction circuit KR. This can be designed in such a manner that the total system functions as an integral control unit, namely when the embodiment illustrated in FIG. 2 is employed. Another embodiment of the correction element KR is illustrated in FIG. 3 and leads to a proportional regulator, while the embodiment illustrated in FIG. 4 leads to a differential regulator.

With respect to the embodiment of the correction circuit according to FIG. 2, it should be appreciated that the signal output of the reference value memory SWS and the signal output of the comparator K1 supplying the deviation $\Delta$ are applied to the inputs of a correction ROM memory K-ROM which, in turn, is connected to a digital counter Z2 controlled by means of the clock pulse $f_t$. The output of the counter Z2 is connected to the signal input of the regulating counter SZ.

The operation of the correction circuit KR is, therefore, the binary differential work $\Delta$ supplied by the comparator K1 is applied as an address to the correction memory K-ROM. Since the dynamic properties of the motor M are speed-dependent, the address word $\Delta$ is expanded by additional bits which specify the adjusted reference speed value, or, respectively, the desired reference value range. The correction memory K-ROM is programmed in such a manner that an output word is available for each address, which word corresponds to the number of adjustment clock pulses by which the regulating counter SZ is to be adjusted at each half wave of the a.c. voltage applied to the motor M so that the motor achieves the reference value. This output word is fed to the counter Z2 which, thereupon, is counted back with the clock pulses $f_t$. The pulses required for this operation are simultaneously employed for the adjustment of the regulating counter SZ.

The proportional control unit differs from the integral control unit in that the correction memory K-ROM, given a specific repetitive error $\Delta$, supplies an output word in such a manner that a single adjustment of the regulating counter SZ is sufficient. It is thereby achieved, by means of a time-out circuit ZSP, which may be formed by a clock digital counter, after the adjustment of the regulating counter ZS is triggered by means of the occurrence of the repetitive error $\Delta$, further adjustments are faded out for a time span corresponding to the time constant of the motor.

The appertaining design of the correction circuit KR is illustrated in FIG. 3. It differs from the embodiment according to FIG. 2 in that the time-out ZSP, which can be realized for example by means of counter flip-flops, is connected between the output of the counter Z2 and the input of the regulating counter SZ.

In a differential regulator, the influencing of the adjusting mangitude is in direct proportion to the rate of increase of the deviation $\Delta$. To this end, it is first written into a first intermediate memory ZW1 and is compared with the deviation derived from a somewhat earlier time and stored in a second intermediate memory ZW2. Accordingly, the embodiment of the correction circuit KR according to FIG. 4 exhibits a first intermediate memory ZW1 and a second intermediate memory ZW2 whose signal outputs are connected to respective inputs of a comparator K3 and are controlled by means of a clock pulse $f_t$. The values $\Delta$ of the deviation respectively emitted by the comparator K1 of the actual value/reference comparison stage arrive at the first intermediate memory ZWI together with the appertaining reference value and, after completion of comparison, are transferred to the second intermediate memory ZW2 whereupon the first intermediate memory ZW1 is then ready for receiving the next following value of the deviation.

The output of the comparator K3 therefore supplies a signal which corresponds to the respective rate of increase of the momentary deviation $\Delta$ and which is then applied as an address to the correction memory K-ROM. As in the embodiment illustrated in FIG. 2, an intermediate counter Z2 connected in front of the regulating counter SZ is charged by means of the correction memory K-ROM.

The embodiment of the correction circuit KR illustrated in FIG. 4 can also be designed in such a manner that the two intermediate memories SW1 and SW2 are alternately charged by means of the actual value/reference value comparison stage (for example, upon employment of a multiplexer). The respectively stored information then remains in the intermediate memory concerned for the duration of two comparisons and is then respectively erased before the third comparison, so that the intermediate memory concerned is available for receiving a new value of the reptitive error $\Delta$. Therewith, the transfer of information from the intermediate memory ZW1 into the intermediate memory ZW2 is omitted.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and promptly be included within the scope of our contribution to the art.

We clam:

1. A speed control circuit for controlling the speed of an a.c. electric motor which is connected to a supply voltage and has a drive shaft and drives a tachometer, comprising:
- a firing angle control circuit connecting the motor to the supply voltage;
- analog/digital converter means including a Schmitt trigger circuit connected to and operated by the tachometer to produce pulses representing actual speed;
- first memory means connected to said analog/digital converter means for storing a digital actual speed signal in response to said pulses;
- second memory means for storing a digital reference speed signal;
- comparison means connected to said first and second memory means for producing an error signal in response to and in accordance with the difference between the digital actual and reference signals;
- digital correction means connected to said comparison means and to said firing angle control circuit for producing a firing angle control signal in accordance with the error signal; and
- clock means connnected to the supply voltage and to said analog/digital converter means and to said correction means and operable to produce clock pulses to synchronize the operation of said control circuit.

2. The control circuit of claim 1, wherein said analog/digital converter means comprises:
- a gate including a first input connected to said clock means, a second input connected to said Schmitt trigger, a third input and an output;
- a clock pulse evaluation circuit connected to said clock means and to said Schmitt trigger circuit for scanning the output of said Schmitt trigger circuit;
- a counter connected to said output of said gate and connected to said clock pulse evaluation circuit and operated to receive a digital word and provide the word to said first memory means as the digital actual speed control signal.

3. The control circuit of claim 2, wherein:
said comparison means comprises a comparator connected between said first and second memory means.

4. The control circuit of claim 3, wherein
said correction means comprises a revolution counter means connected to and controlled by said clock means;
a regulating counter means connected to and controlled by said comparator; and
another comparator connected to and operated in response to said revolution and regulating counters to provide said firing angle control signal to said firing angle control circuit.

5. The control circuit of clam 4, wherein:
said correction means comprises a programmable read-only memory for receiving the error signal and the output of said second memory means; and
a digital counter connected to the output of said programmable read-only memory for inputting information to said regulating counter.

6. The control circuit of claim 4, wherein:
said correction means comprises a read-only memory;
a clock-controlled digital counter connected to said clock means and to said comparator and connected to feed said regulating counter.

7. The control circuit of claim 6, comprising:
a timing circuit having a predetermined time delay, connected between said digital counter and said regulating counter.

8. The control circuit of claim 4, wherein said correction means comprises:
first and second intermediate memories;
said first intermediate memory connected to said second memory means and to said comparison means to receive said error signal;
a second intermediate memory connected to and fed by said first intermediate memory;
a further comparator connected to said first and second intermediate memories for comparing the storage contents; and
control means connecting said further comparator to said firing angle control circuit and operable to adjust the firing angle in accordance with the output of said further comparator.

9. The control circuit of claim 1, wherein said control means comprises:
a programmed read-only memory connected to said and accessed by said further comparator;
a clock-controlled counter connected to said clock means and to said programmed read-only memory;
a revolution counter connected to and operated by said clock means;
an additional comparator connected to said revolution and regulation counters and operable to provide an ignition pulse to said firing angle control circuit.

10. The control circuit of claim 1, wherein:
said first memory means and said second memory means are each constructed as digital counters connected such that one of said counters causes backward counting of the other of said counters so as to also constitute said comparison means.

* * * * *